(12) United States Patent
Bailey et al.

(10) Patent No.: US 10,510,372 B1
(45) Date of Patent: Dec. 17, 2019

(54) MECHANICAL RETENTION AND RETRIEVAL FOR TAPE STORAGE CARTRIDGE

(71) Applicant: Amazon Technologies, Inc., Seattle, WA (US)

(72) Inventors: Kevin Bailey, Seattle, WA (US); Christopher Strickland Beall, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 15/612,943

(22) Filed: Jun. 2, 2017

(51) Int. Cl.
*G11B 15/68* (2006.01)
*G11B 15/675* (2006.01)

(52) U.S. Cl.
CPC ........ *G11B 15/67502* (2013.01); *G11B 15/68* (2013.01); *G11B 15/682* (2013.01); *G11B 15/6835* (2013.01)

(58) Field of Classification Search
None
See application file for complete search history.

(56) References Cited

U.S. PATENT DOCUMENTS

| | | | | |
|---|---|---|---|---|
| 4,678,245 A | * | 7/1987 | Fouassier | G11B 33/04 206/308.1 |
| 4,850,485 A | * | 7/1989 | Ishikawa | G11B 23/0236 211/40 |
| 5,456,528 A | * | 10/1995 | Dalziel | G11B 15/685 312/9.46 |
| 5,795,042 A | * | 8/1998 | Todor | E05B 65/462 312/221 |
| 5,867,458 A | * | 2/1999 | Barkley | G11B 15/6825 206/387.15 |
| 5,927,834 A | * | 7/1999 | Todor | E05B 65/462 312/221 |
| 6,526,017 B1 | * | 2/2003 | Smith | G11B 15/68 369/178.01 |
| 6,549,358 B1 | * | 4/2003 | Billy | G11B 15/6835 360/69 |
| 7,016,144 B2 | | 3/2006 | Yamakawa et al. | |
| 7,193,810 B2 | * | 3/2007 | Dickey | B25J 13/088 360/92.1 |
| 7,360,982 B2 | | 4/2008 | Hiraguchi et al. | |
| 7,753,638 B2 | * | 7/2010 | Ishiyama | G11B 17/225 414/277 |

(Continued)

FOREIGN PATENT DOCUMENTS

| | | | | |
|---|---|---|---|---|
| EP | 0500385 A2 | * | 8/1992 | ........... G11B 17/225 |
| JP | 01146157 A | * | 6/1989 | |
| JP | 01263973 A | * | 10/1989 | |

(Continued)

*Primary Examiner* — William J Klimowicz
(74) *Attorney, Agent, or Firm* — Kilpatrick Townsend & Stockton LLP (57) ABSTRACT

A tape library rack includes partitions defining a slot for receiving a tape cartridge. A hook is coupled with the rack to engage a notch in the cartridge and retain the cartridge within the rack slot. A gripper for retrieving the cartridge includes a ramped surface to engage the hook and laterally displace the hook from the cartridge notch as the hook travels along the ramped surface. The gripper engages the notch from which the hook has been displaced and pulls the cartridge from the slot.

15 Claims, 5 Drawing Sheets

(56) References Cited

U.S. PATENT DOCUMENTS

2004/0109259 A1* 6/2004 Hiraguchi .............. G11B 15/68
360/92.1

FOREIGN PATENT DOCUMENTS

| JP | 01317265 A | * | 12/1989 | ......... G11B 23/0236 |
| JP | 02081352 A | * | 3/1990 | |
| JP | 04069854 A | * | 3/1992 | |
| JP | 04186576 A | * | 7/1992 | |
| JP | 10011867 A | * | 1/1998 | |

* cited by examiner

MECHANICAL RETENTION AND RETRIEVAL FOR TAPE STORAGE CARTRIDGE

BACKGROUND

Datacenters and other facilities often have large data storage capabilities. Sometimes these capabilities are implemented using tape library units. The library units include tape cartridges (sometimes alternatively termed cassettes), which can be removed from and replaced to the library units as needed.

So that the tape library units can be used efficiently and reliably, it is important that the tape cartridges stay correctly positioned in the library units when the cartridges are not in use, even in light of movement of the library, for example during seismic activity or during movement of surrounding equipment. However, the cartridges also need to be readily available for use.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments herein are directed to tape library units, for example, which may be particularly suited for use in a data center environment. Tape library units may include magnetic tape data storage components. Such tape may be utilized as a cost-effective medium for backing up hard drives or other types of disk storage. For example, tape may be more compact and economic for storing data than disk storage for data that is to be infrequently accessed, such as in backup scenarios. The tape is typically packaged in tape cartridges within a tape library unit. The tape cartridges are generally maintained within slots in a rack from which a robotic gripper can selectively retrieve tape cartridges for transferring to a reader.

In various embodiments, the tape library unit can include hooks that can engage notches in the tape cartridges. This engagement between the hooks and the notches can secure the tape cartridges within respective slots in the rack. The hooks may also be arranged for engaging arms of the gripper. For example, as the gripper approaches a particular tape cartridge for retrieval, the gripper arms may engage the hooks and push the hooks laterally out of the notches of a tape cartridge. The arms of the gripper may move into the notches of the tape cartridge (e.g., into the space vacated by the hooks) and thus clamp the gripper to the tape cartridge. This engagement between the upper arms and the notches can secure the tape cartridge during movement by the gripper between the slot and other locations, such as a reader. Thus, the combination of the hooks and the gripper may cause the tape cartridge to be secured both while stored and while being retrieved and reduce or eliminate windows of time in which the tape cartridge is susceptible to falling out of the slot or otherwise moving to a location that is problematic for access by the gripper.

In various embodiments, the hooks may include spring steel or another suitably flexible and resilient material. Flexibility of the hooks may facilitate the lateral displacements of the hooks in response to the gripper retrieving a tape cartridge secured by the hooks. The resiliency of the hooks may bias the hooks back into an unflexed position when no longer prevented from doing so by the gripper or tape cartridge. This may cause the hooks to extend into a path of travel that a tape cartridge will take when being inserted into a slot by the gripper for storage. As the cartridge is inserted into the slot, the flexibility of the hooks may cause the hooks to laterally displace and allow the tape cartridge to pass between the hooks. Upon removal of the gripper arms from the notches in the tape cartridge, the resiliency of the hooks may cause the hooks to move into the notches vacated by the gripper arms. Thus, the combination of hooks in the gripper may cause the tape cartridge to be secured both while being stowed and while stored.

Reference will now be made to the Figures, in which like reference numerals refer to like elements throughout the Figures. In many instances, similar elements may be identified by the same reference numeral and differentiated by a different letter suffix in the Figures. Thus in the following text description, elements may be referenced with suffixes (e.g., for referencing individual or specific elements such as a first hook 112A or a second hook 112B) or without suffixes (e.g., for generally or collectively referencing elements such as one or more of the hooks 112).

Figure 1:
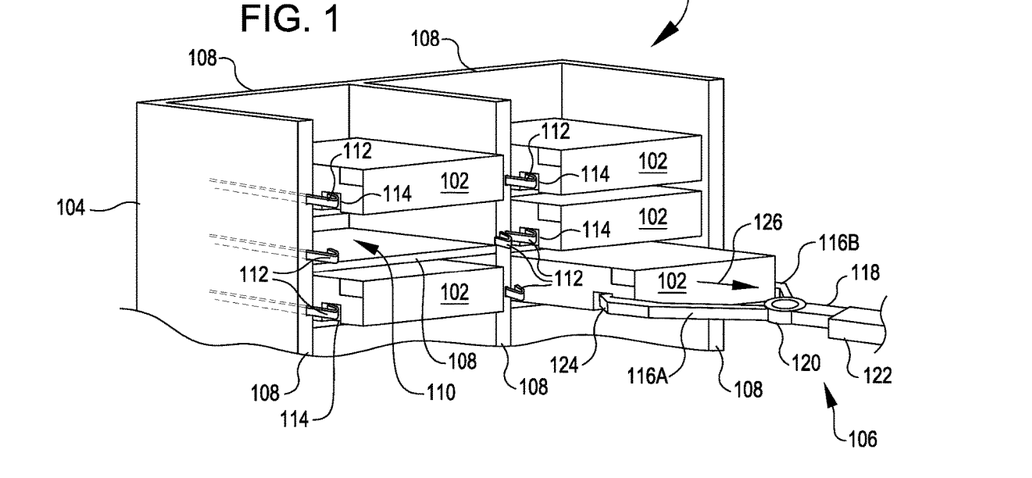
FIG. 1 shows a tape retention and retrieval system according to certain embodiments.

FIG. 1 shows a tape retention and retrieval system 100 according to certain embodiments. The illustrated system 100 includes cartridges 102, a rack 104, and a gripper 106. Generally, the cartridges 102 are received in the rack 104 for storage, and the gripper 106 can be utilized to remove cartridges 102 from the rack 104 (as at arrow 126, e.g., to transport a selected cartridge 102 to another device for reading or writing data relative to the tape of the cartridge 102) or to insert cartridges 102 into the rack 104 (as opposite arrow 126, e.g., upon completing an accessing event of the cartridge away from the rack 104).

The rack 104 includes partitions 108 that define slots 110 for receiving the tape cartridges 102. The partitions 108 can include plastic, metal, or any other suitable material or combination of materials for providing structure of the rack 104. In FIG. 1, the partitions 108 include lateral partitions, a rear partition, and a bottom partition that generally define a rectangular slot 110. However, other variations are possible, including, but not limited to—C shaped partitions or other partitions that can support the tape cartridges 102.

The rack 104 also includes hooks 112. The hooks 112 are coupled with the partitions 108. Although the illustrated hooks 112 are shown as separate elements that are inserted into or otherwise connected to the partitions 108, the hooks 112 may additionally or alternatively include features that are integrally formed as part of the partitions 108. Although a specific shape for the hooks 112 is shown in FIG. 1, the hooks 112 may include any curved, bent back, or otherwise angled part or structure for catching hold of another element. In particular, the hooks 112 may be sized and arranged for engaging corresponding notches 114 of the cartridges 102. Engagement between the hooks 112 and the notches 114 may retain the cartridges 102 in the slots 110, e.g., when the cartridges 102 are in a stored state awaiting retrieval by the gripper 106. In various embodiments, the shape of the hooks 112 may be such that the hooks 112 when engaged laterally in the notches 114 will resist or not permit axial movement of the cartridge 102 from the slot 110 absent breakage or permanent deformation of the hooks 112 and/or of the notches 114. For example, an angle of the sloped extensions 138 rearwardly and inwardly toward the rear 132 of the slot 110 (e.g., leftward and toward the center of the slot 110 in FIG. 2) may prevent the hooks 112 from releasing from the notches 114 if a seismic event or other significant force were to push or pull the cartridge 102 away from the rear of 132 of the slot 110 (e.g., rightward in FIG. 2). Such shaping may reduce a risk of inadvertent removal of the cartridge 102 in comparison to shapes of hooks 112 that are otherwise ramped to automatically move laterally out of engagement of the notches 114 in response to a pulling of the cartridge 102 from the slot 110. Put another way, the hooks 112 may be shaped such that an increase in a force urging the cartridge 102 from the slot 110 causes an increase in a resisting force provided by the hooks 112 that opposes removal of the cartridge 102 from the slot 110.

The gripper 106 can include suitable features for engaging the hooks 112 and/or the cartridge 102. The gripper 106 shown in FIG. 1 includes a first arm 116A, a second arm 116B, a base 118, a pincher 120, and a driver 122.

The pincher 120 can correspond to any suitable structure for causing the gripper 106 to grip the cartridge 102. For example, the depicted pincher 120 corresponds to a pivot for causing the first arm 116A and the second arm 116B to move relative to the base 118 and toward one another. This may allow the arms 116 to engage the notches 114 in the cartridge 102. Non-limiting examples of other suitable mechanisms that may be included in the pincher 120 include sliding rails, motors, gears, solenoids, or pneumatic actuators.

The driver 122 can correspond to any suitable structure for causing the gripper 106 to move relative to the rack 104. For example, the depicted driver 122 corresponds to a telescoping rod that allows the gripper 106 to extend axially toward or away from a slot 110 in which a cartridge 102 is received or to be received. Non-limiting examples of other suitable mechanisms that may be included in the driver 122 include sliding rails, motors, gears, wheels, or robotic arms.

The gripper 106 can also include ramped surfaces 124. For example, in FIG. 1, a ramped surface 124 is visible on the first arm 116A. The ramped surface 124 visible in FIG. 1 on the first arm 116A extends away from the base 118 and toward the second arm 116B. In operation, the ramped surface 124 may allow the gripper 106 to displace the hook 112 laterally during operations relative to a slot 110, such as explained in greater detail with respect to FIGS. 2-4 below.

Figure 2:
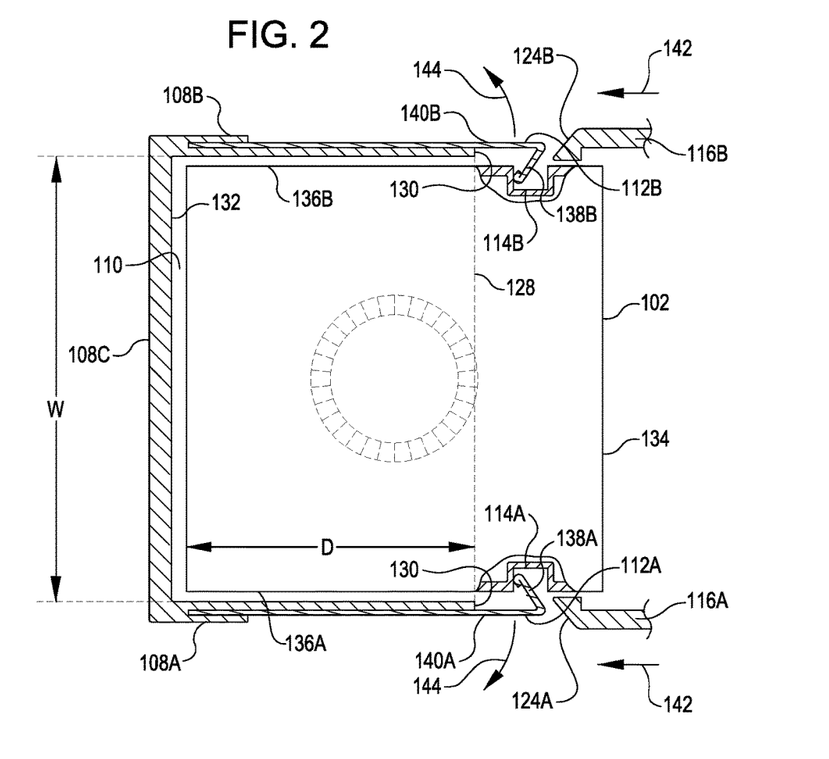
FIG. 2 shows a top cutaway view of a cartridge received in a slot of the system of FIG. 1 according to certain embodiments.

FIG. 2 shows a top cutaway view of a cartridge 102 received in a slot 110 according to certain embodiments. The slot 110 in FIG. 2 includes a depth D and a width W. The width W is defined in a lateral direction between a first lateral partition 124A and a second lateral partition 124B (e.g., from bottom of the page toward the top in the view of FIG. 2). The depth D is defined in an axial direction, e.g., along a forward direction and rearward direction corresponding to directions that the cartridge 102 can be moved to be inserted or removed from the slot 110 (e.g., leftward or rightward in the view of FIG. 2). The slot 110 also includes a front edge 128. The depth D may be defined between the rear partition 108C (which defines a rear 132 of the slot 110 in FIG. 2) and a front edge 128 of the slot 110. The front edge 128 defines a boundary of the slot 110 at which the tape cartridge 102 transitions between being at least partially received within the slot 110 and fully removed from the slot 110 when moved along a path of travel relative to the slot 110 (e.g., in the axial direction corresponding to leftward or rightward in the view of FIG. 2). The front edge 128 may be defined at least in part by any suitable combination of partitions 108. For example, in FIG. 2, the a front edge 128 is defined at least in part by forward edges 130 of the first lateral partition 108A and the second lateral partition 108B. The front edge 128 may additionally or alternatively be defined at least in part by a floor partition 108 (e.g., such as floor partition 108 D shown in FIG. 5 or 8) if present.

The tape cartridge 102 in FIG. 2 includes a body 134. The body 134 may be defined at least in part by a first lateral side wall 136A and a second lateral side wall 136B. A first notch 114A is shown formed in the first lateral side wall 136A and a second notch 114B in the second lateral side wall 136B. Generally, the illustrated body 134 has a rectangular form factor with the notches 114 and other features corresponding to variations in the rectangular shape, but other form factors could be used, including, but not limited to form factors that include tapered, curved, or other types of contoured features.

FIG. 2 further shows a first hook 112A and a second hook 112B associated with the slot 110. In particular, the first hook 112A is shown coupled with the first lateral partition 108A. The depicted first hook 112A includes a first elongate member 140A and a first sloped extension 138A. The first elongate member 140 is shown extending along the first lateral partition 108A and terminating in the first sloped extension 138A. The first sloped extension 138A is shown with a proximal end coupled with the first elongate member 140 and with a distal end angled toward an interior of the slot 110 and toward a rear 132 of the slot 110.

The second hook 112B in FIG. 2 is a mirror reflection of the first hook 112A and thus includes similar features with respect to the second lateral partition 108B. Additionally, each of the first hook 112A and the second hook 112B are shown extending past the front edge 128 of the slot 110. Such an extension past the front edge 128 of the slot 110 may render the hooks 112 readily accessible for engagement with the gripper 106.

In operation, the gripper 106 may be moved toward the slot 110 for retrieving the cartridge 102. For example, as shown at arrows 142, this may entail the arms 116 of the gripper 106 being moved along the axial direction toward the slot 110 (e.g., leftward in FIG. 2) As previously noted, the gripper arms 116 may include respective ramped surfaces 124. The ramped surfaces 124 may be angled to extend away from the base 118 and toward an opposite arm 116. When the gripper 106 is proximate the slot 110, this may result in the ramped surfaces 124 being oriented to angle toward an interior and rear 132 of the slot 110. In other words, the ramped surfaces 124 of the gripper 106 and the sloped surfaces 138 of the hooks 112 may be aligned with one another. Moving the gripper 106 (as at arrows 142) toward the rear 132 of the slot 110 may cause the ramped surfaces 124 of the arms 116 of the gripper 106 to engage and travel along the sloped surfaces 138 of the hooks 112. Such engagement may cause the hooks 112 to laterally deflect, e.g., as illustrated by arrows 144. For example, the hooks 112 may deflect from the position shown in FIG. 2 to the position shown in FIG. 3.

Figure 3:
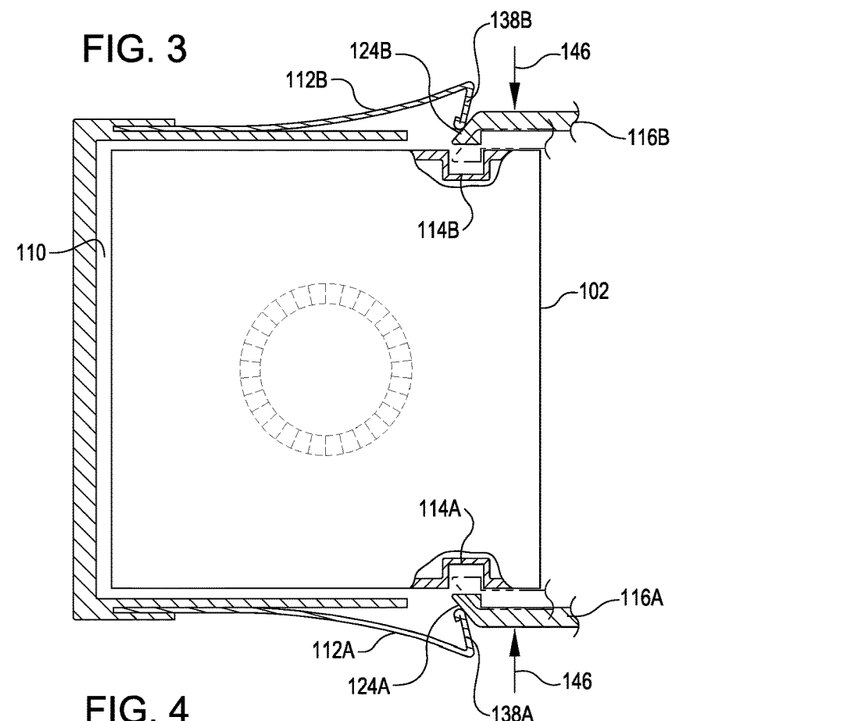
FIG. 3 shows a top cutaway view of hooks in a position deflected away from notches of the cartridge of FIG. 2 according to certain embodiments.

FIG. 3 shows a top cutaway view of the hooks 112 in a position deflected away from the notches 114 in the cartridge 102 due to the presence of the arms 116 of the gripper according to certain embodiments. As depicted by arrows 146, the arms 116 can be laterally moved (e.g., brought toward one another) to engage the notches 114 of the cartridge 102. For example, the arms 116 may be moved together by operation of the pincher 120.

Figure 4:
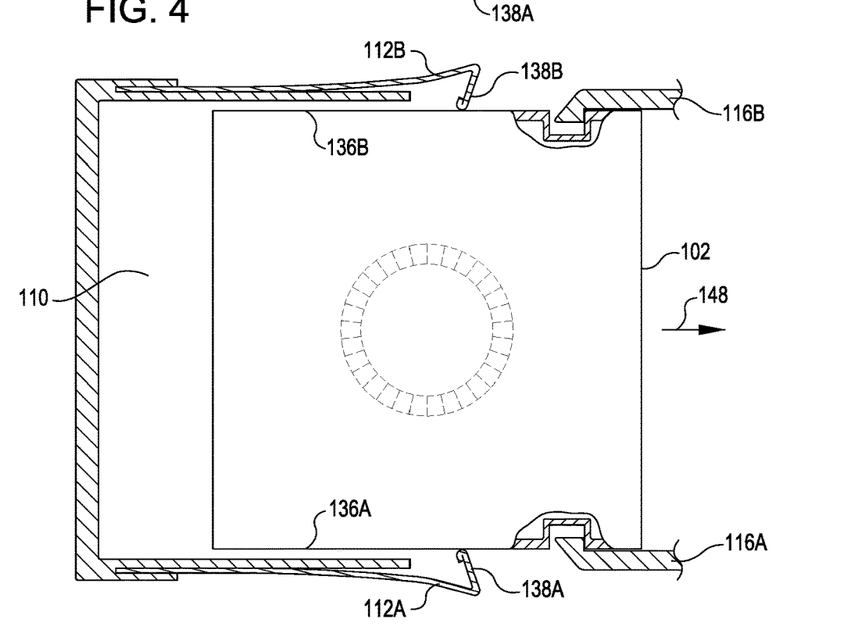
FIG. 4 shows a top cutaway view of the cartridge of FIG. 3 at least partially removed from the slot according to certain embodiments.

FIG. 4 shows a top cutaway view of the cartridge 102 at least partially removed from the slot 110. For example, upon engaging the notches 114 with the arms 116 (e.g., in the space vacated by the hooks 112), the gripper 106 may pull the cartridge 102 from the slot 110 (e.g., as illustrated by arrow 148). This may allow the hooks 112 to travel off of the arms 116 of the gripper 106 and onto the side walls 136 of the cartridge 102. For example, a resiliency of material in the hooks 112 may bias the hooks 112 toward this movement, e.g., causing the hooks 112 to flex from the position shown in FIG. 3 toward the position in FIG. 4. Complete removal of the cartridge 102 from the slot 110 and past the hooks 112 may allow the hooks 112 to continue to move further under the biasing effect of the material, e.g., back to the position of the hooks 112 shown in FIG. 2. This may position the hooks 112 back in a path of travel upon insertion of the same or other cartridge 102 to the slot 110 by the gripper.

Thus, a process of inserting a cartridge 102 into the slot 110 may substantially correspond to a reverse progression through FIGS. 2-4. For example, as the cartridge 102 is inserted into the slot 110, a flexibility of the material of the hooks 112 may allow the hooks 112 to flex laterally upon contacting the side walls 136 of the cartridge 102 (e.g., to reach the state shown in FIG. 4). Further insertion of the cartridge 102 may cause the hooks 112 to engage the arms 116 of the gripper 106 and deflect an additional amount laterally (e.g., to reach the state shown in FIG. 3). Following the lateral movement of the arms 116 of the gripper 106 (to disengage the notches 114 of the cartridge 102) and the axial movement of the arms 116 of the gripper 106 (to move away from the cartridge 102), the resilience of the hooks 112 may bias the hooks 112 to return from their flexed state and to move into the notches 114 of the cartridge 102 (e.g., to reach the state shown in FIG. 4). In this manner, the hooks 112 may flex laterally to either receive or release the cartridge 102 in response to interaction of the hooks 112 with the arms 116 of the gripper 106.

Hooks 112 may be arranged in any suitable manner to facilitate operation of the hooks 112 for adjacent slots 110. For example, a first arrangement of hooks 112 is shown and described with reference to FIGS. 5-7, while a second arrangement of hooks 112 is shown and described with reference to FIGS. 8-10.

Figure 5:
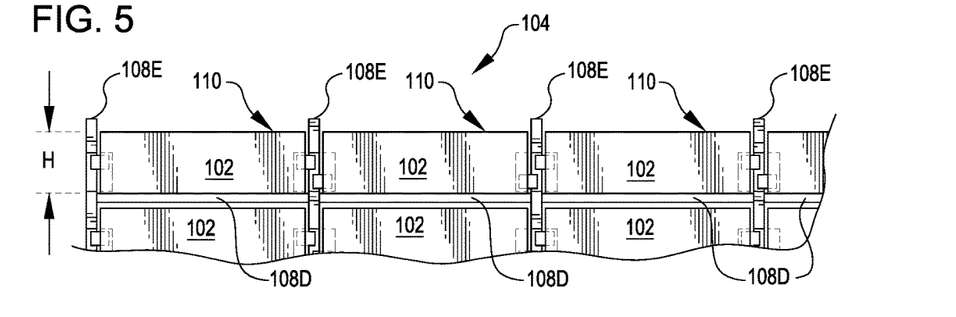
FIG. 5 is a front view showing an example of vertically offset hooks that may be utilized in the system of FIG. 1 according to certain embodiments.

FIG. 5 is a front view showing an example of rack 104 featuring vertically offset hooks according to certain embodiments. In FIG. 5, the rack 104 includes lateral partitions 108E that separate laterally adjacent slots 110. Each of the slots 110 is shown having a height H that is defined extending upward from a bottom partition 108D. However, the height H of any given slots 110 additionally or alternatively may be defined by other features.

Figure 6:
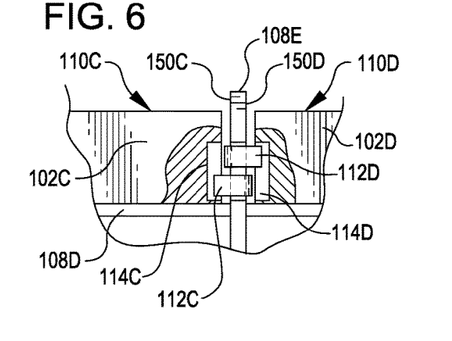
FIG. 6 is a front view showing the vertically offset hooks of FIG. 5 in a securing state according to certain embodiments.

FIG. 6 is a front view showing vertically offset hooks 112 in a securing state according to certain embodiments. FIG. 6 shows a first slot 110C and an adjacent slot 110D that are separated by the lateral partition 108E. For example, the lateral partition 108E is situated between the first slot 110C and the adjacent slot 110D. The lateral partition 108E is shown including opposite sides 150 (e.g., a left side 150C and a right side 150D).

The first slot 110C is associated with a first hook 112C which is shown extending into a corresponding first notch 114C of a first cartridge 102C received in the first slot 110C. Similarly, the adjacent slot 110D is associated with an adjacent hook 112D which is shown extending into a corresponding adjacent notch 114D of an adjacent cartridge 102D received in the adjacent slot 110D. The first hook 112C and the adjacent hook 112D are shown vertically offset from one another in the height direction, e.g., with the first hook 112C being below the adjacent hook 112D. Such an arrangement may prevent the first hook 112C and the adjacent hook 112D from interfering with one another or impinging upon one another when moving to a released state such as that shown in FIG. 6 for the adjacent hook 112D.

Figure 7:
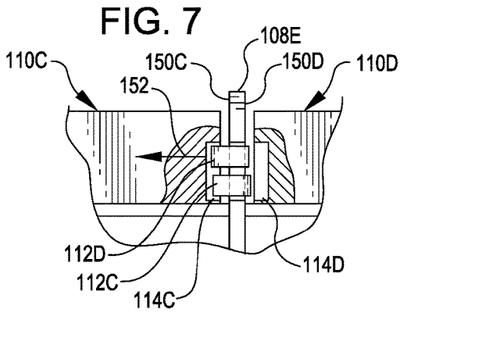
FIG. 7 is a front view showing one of the vertically offset hooks of FIG. 6 in a released state according to certain embodiments.

FIG. 7 is a front view showing one of the vertically offset hooks 112 in a released state according to certain embodiments. As shown by arrow 152 in FIG. 7, the adjacent hook 112D may be moved out of engagement with the adjacent notch 114D, for example, by interaction with the gripper 106. Yet, the placement of the first hook 112C does not prevent such deflection by the adjacent hook 112D because the first hook 112C is vertically offset from (e.g., below) the adjacent hook 112D. Although the adjacent hook 112D is shown extending in front of or into the first notch 114C, in some embodiments, the adjacent hook 112D may deflect out of a path of travel of the adjacent cartridge without impinging on the path of travel of the first cartridge 102C.

Figure 8:
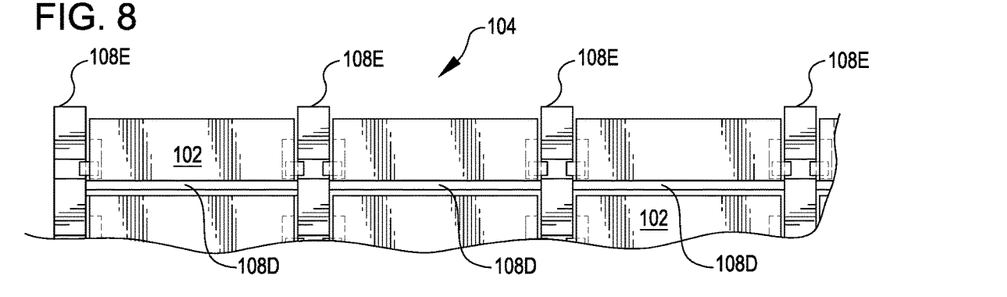
FIG. 8 is a front view showing an example of laterally offset hooks that may be utilized in the system of FIG. 1 according to certain embodiments.

FIG. 8 is a front view showing an example of rack 104 featuring laterally offset hooks according to certain embodiments. In FIG. 6, the rack 104 includes lateral partitions 108E that separate laterally adjacent slots 110. Each of the slots 110 is shown also bounded by a bottom partition 108D. However, any given slots 110 additionally or alternatively may be defined by other features.

Figure 9:
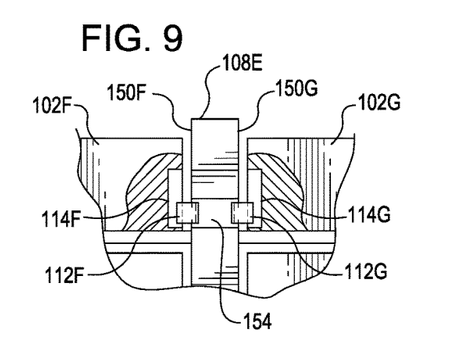
FIG. 9 is a front view showing the laterally offset hooks of FIG. 8 in a securing state according to certain embodiments.

FIG. 9 is a front view showing laterally offset hooks 112 in a securing state according to certain embodiments. FIG. 9 shows a first slot 110F and an adjacent slot 110G that are separated by the lateral partition 108E. For example, the lateral partition 108E is situated between the first slot 110F and the adjacent slot 110G. The lateral partition 108E is shown including opposite sides 150 (e.g., a left side 150F and a right side 150G).

The first slot 110F is associated with a first hook 112F which is shown extending into a corresponding first notch 114F of a first cartridge 102F received in the first slot 110F. Similarly, the adjacent slot 110G is associated with an adjacent hook 112G which is shown extending into a corresponding adjacent notch 114G of an adjacent cartridge 102G received in the adjacent slot 110G. The first hook 112F and the adjacent hook 112G are shown laterally offset from one another by a gap 154 in the lateral direction, e.g., with the first hook 112F being to the left of the adjacent hook 112G. Such an arrangement may prevent the first hook 112F and the adjacent hook 112G from interfering with one another or impinging upon one another when moving to a released state such as that shown in FIG. 10 for the first hook 112F and the adjacent hook 112G.

Figure 10:
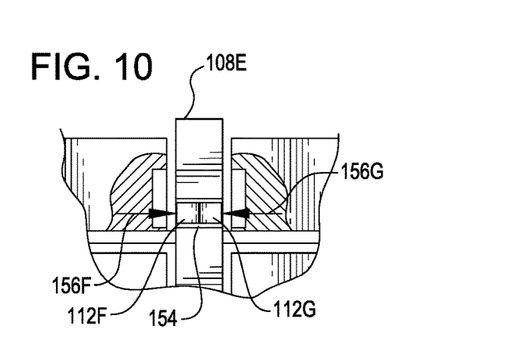
FIG. 10 is a front view showing the laterally offset hooks of FIG. 9 in a released state according to certain embodiments.

FIG. 10 is a front view showing the laterally offset hooks 112 in a released state according to certain embodiments. As shown by arrow 156F in FIG. 10, the first hook 112F may be moved out of engagement with the first notch 114F, for example, by interaction with the gripper 106. Yet, the placement of the adjacent hook 112G does not prevent such deflection by the first hook 112F because the adjacent hook 112G is laterally offset from (e.g., to the right of) the first hook 112F. For example, the first hook 112 F has space within the gap 154 that the first hook 112F can deflect into without inhibiting similar deflection into the gap 154 by the adjacent hook 112G. Moreover, although the gap 154 is shown with a sufficient size for the first hook 112F and the adjacent hook 112G to both deflect into the gap 154 at the same time, in some embodiments, the gap 154 may instead by sized to accommodate one at a time.

Additionally hooks 112 can be coupled with a corresponding partition 108 in any suitable manner. For example, in FIG. 6, the first hook 112C corresponds to a structure attached to an exterior of the partition 108E, while in FIG. 9, the first hook 112F corresponds to a structure attached to an interior of the partition 108E. Furthermore, although in FIG. 5, the first hook 112C for the first slot 110 (e.g., on the left) corresponds to a structure attached to an exterior of the partition 108E on an opposite side 150D (e.g., right side) that faces the adjacent slot 110D (e.g., on the right), the first hook 112C could alternatively be mounted on the exterior of the near side 150C (e.g., left side) of the partition 108E. Moreover, although FIG. 2 illustrates an example of a hook 112B received in a corresponding void in the partition 108B, hooks 112 may be attached by projections or other features of a partition 108.

In some embodiments, a hook 112 may be installed in a partition within a feature formed by a passing core technique. For example, FIGS. 11-16 illustrate one example of a series of operations that may be performed to this end.

Figure 11:
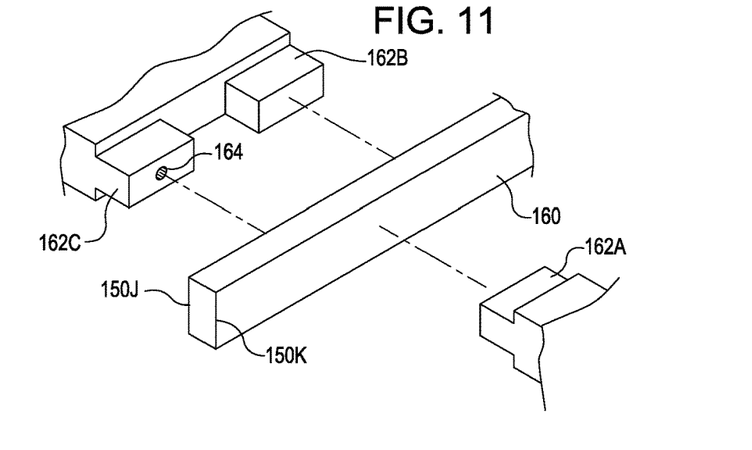
FIG. 11 shows a perspective view of a work piece and tools that may be utilized to make a partition for receiving a hook of the system of FIG. 1 according to certain embodiments.

FIG. 11 shows a perspective view of a work piece 160 and tools 162 that may be utilized to make a partition 108 for receiving a hook 112 according to certain embodiments. The work piece 160 is shown as a panel with opposite sides 150J and 150K. The tools 162 are shown as respective projections. Although tool 162B and 162C are shown as projections on a single die, they could alternatively correspond to tools on separate dies. Tool 162C also includes a recess 164.

Figure 12:
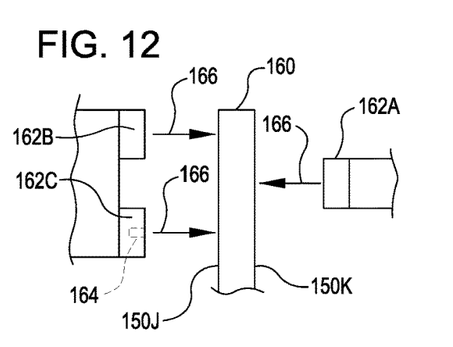
FIG. 12 shows a top view of the work piece and the tools of FIG. 11 according to certain embodiments.

FIG. 12 shows a top view of the work piece 160 and the tools 162. As shown by arrows 166, the first tool 162A may be brought toward the first side 150K of the work piece 160, while the second side 150J is approached by the second tool 162B and third tool 162C.

Figure 13:
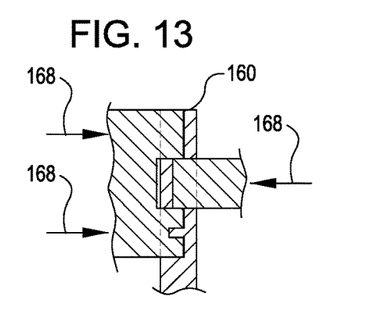
FIG. 13 shows a top cutaway view with the tools of FIG. 12 inserted into the work piece according to certain embodiments.

FIG. 13 shows a top cutaway view with the tools 162 inserted into the work piece 160. As shown by arrows 168, the first tool 162A may be brought into a first side 150K of the work piece 160 to cause deformation, while a second side 150J is deformed by the second tool 162B and third tool 162C.

Figure 14:
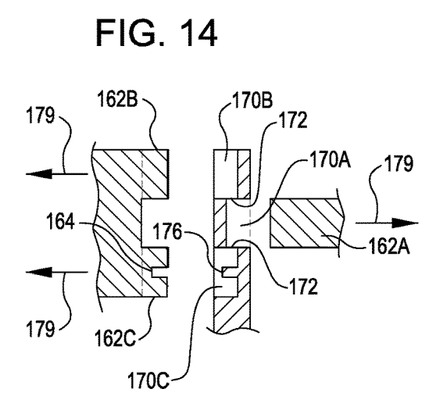
FIG. 14 shows a top cutaway view with the tools of FIG. 13 removed from the work piece according to certain embodiments.

FIG. 14 shows a top cutaway view with the tools 162 removed from the work piece 160. As shown by arrows 179, the first tool 162A may be removed from the first side 150K of the work piece 160 to cause reveal a first depression 170A in the first side 150K of the work piece, while the second tool 162B and third tool 162C may be removed from the second side 150J to reveal a second depression 170B and a third depression 170C in the second side 150J. The first depression 170A is axially offset from the second depression 170B and the third depression 170C. The first depression may have portions 172 that overlap (e.g., laterally) with the second depression 170B and the third depression 170C. For example, with reference to FIG. 15, a passage 174 may extend through the overlap portions 172 of the depressions 170.

Figure 15:
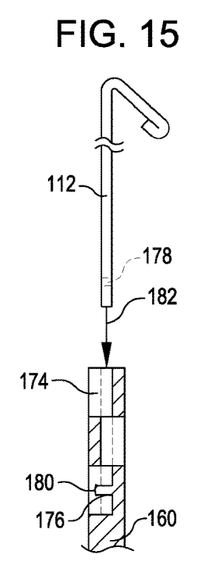
FIG. 15 shows a top cutaway view with a hook aligned for insertion into the work piece of FIG. 14 according to certain embodiments.

FIG. 15 shows a top cutaway view with a hook 112 aligned for insertion into the work piece 160. The hook 112 may be sized to fit in the passage 174 formed by the depressions 170. For example, the hook 112 may be moved as illustrated by arrow 182 into the position shown in FIG. 16.

Figure 16:
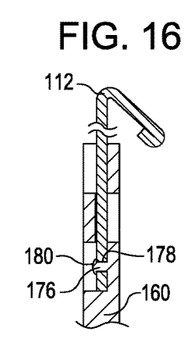
FIG. 16 shows a top cutaway view with the hook of FIG. 15 received within the work piece according to certain embodiments.

FIG. 16 shows a top cutaway view with a hook 112 received within the work piece 160. The hook 112 may be secured in the passage 174 by any suitable technique. As one example, the hook 112 may be friction fit into the passage 174. In some embodiments, the act of inserting the hook 112 into the passage 174 may cause deflection in either or both of the hook 112 or the work piece 160 which exerts a force that resists subsequent extraction of the hook 112 from the passage 174.

In some embodiments, other features may be utilized additionally or alternatively to secure the hook 112 in the passage 174 or to the work piece 160 that is to be form at least part of a partition 108. For example, as best seen in FIG. 15, the work piece 160 may include a projection 176 that is received in an opening 178 in the hook 112. In some embodiments, the projection may be formed as a negative form of a molding feature, e.g., as a result of the recess 164 included in the tool 162C. In some embodiments, a projection 176 may be included on the hook 112 while the opening is included in the work piece 160. In some embodiments, a tip 180 of a projection 176 may be melted over an opening 178 (e.g., by a heat-staking process) to permanently secure the hook 112 and work piece 160 together. Moreover, although these construction techniques have been described as used together, any one could be omitted, substituted, or combined with any other of these or other suitable construction techniques.

Although FIG. 1 primarily shows slots 110 that each have two corresponding hooks 112, other numbers of hooks 112 and/or other associated features can be utilized. One example is shown in FIGS. 17-18.

Figure 17:
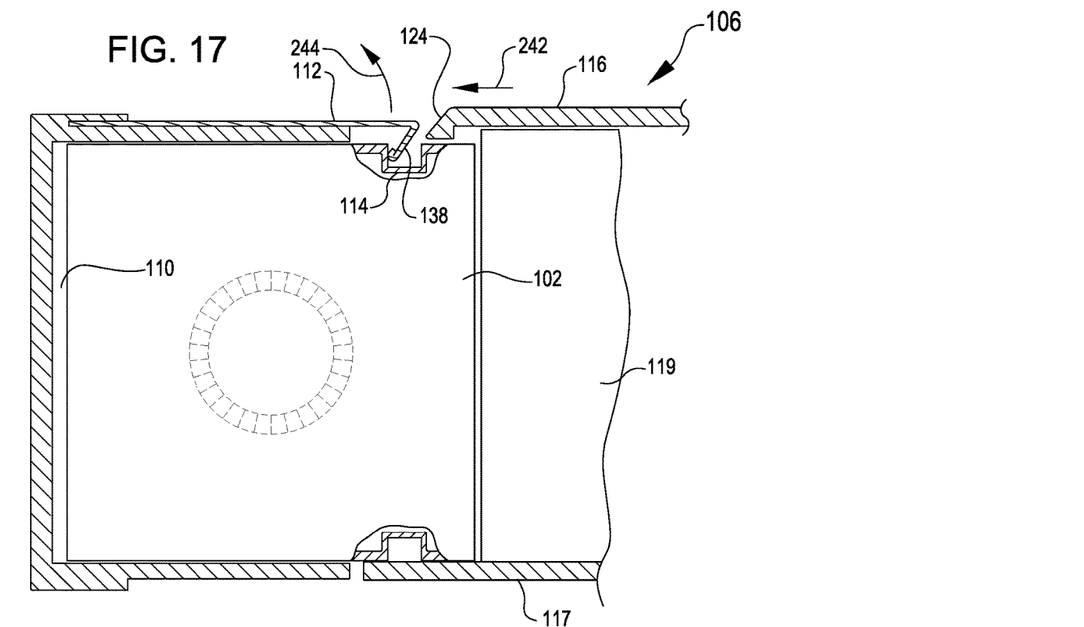
FIG. 17 shows a top cutaway view of a cartridge retained in a slot by a single hook according to certain embodiments.
Figure 18:
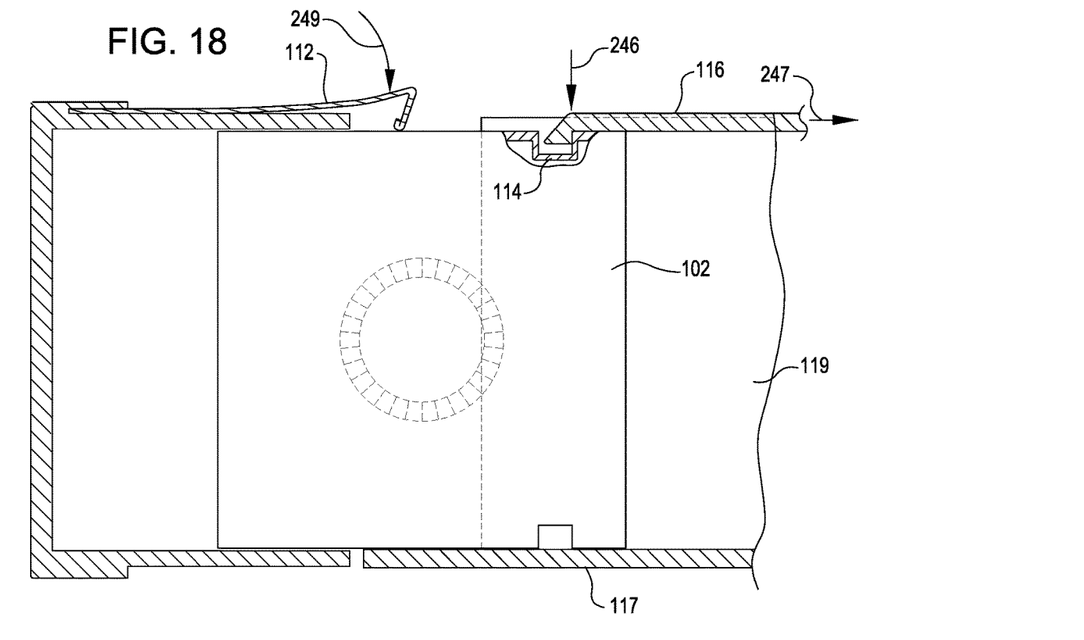
FIG. 18 shows a top cutaway view of the cartridge of FIG. 17 at least partially removed from the slot according to certain embodiments.

FIG. 17 shows a top cutaway view of a cartridge 102 retained in a slot 110 by a single hook 112 according to certain embodiments. For example, the cartridge 102 may be retained in the slot 110 by a combined effect of the single hook 112 engaging a notch 114 of the cartridge 102 on one side and a partition 108 abutting, contacting, or otherwise engaging an opposite side of the cartridge 102. Such an arrangement may prevent the cartridge 102 from rotating or moving by an amount that might otherwise allow the hook 112 to move out of the notch 114 or otherwise permit unhindered removal of the cartridge 102 from the slot 110.

The gripper 106 shown in FIG. 17 includes a single arm 116 that is capable of a pinching motion. A backstop member 117 is shown in FIG. 17 opposite the arm 116 and may provide a suitable surface toward which the pincher arm 116 can press to trap, pinch, or otherwise grip an object such as the cartridge 102. In some embodiments, the backstop member 117 may correspond to a portion of the gripper 116 that is not equipped with a pincher 120 for lateral movement. In some embodiments, the backstop member 117 may additionally or alternatively correspond to a structure extending from a tray 119 for receiving the cartridge 102 and bearing the cartridge 102 toward or away from the slot 110.

In an example extraction operation, the pincher arm 116 can move axially toward the hook 112 (as at arrow 242). This may cause engagement between the ramped surface 124 on the pincher arm 116 and the sloped extension 124 of the hook 112 to cause the hook 112 to move (as at arrow 244) and deflect out of the notch 114 of the cartridge 102.

FIG. 18 shows a top cutaway view of the cartridge 102 of FIG. 17 at least partially removed from the slot 110 according to certain embodiments. Continuing with the example extraction operation, the pincher arm 116 may move laterally (as at arrow 246) into the notch 114 of the cartridge 102, e.g., toward the backstop member 117. Moving into the notch 114 may provide engagement by which the pincher arm 116 can pull the cartridge 102 onto the tray 119. For example, the pincher arm 116 may move axially relative to the tray 119 (e.g., as at arrow 247). Additionally or alternatively the pincher arm 116 may push the cartridge 102 against the backstop member 117 with sufficient force to cause the cartridge to be securely gripped between the pincher arm 116 and the backstop member 117. In some embodiments, the pincher arm 116 may be movable axially separately from the backstop member 117, e.g., such that the pincher arm 116 can drag the cartridge 102 along the backstop member 117 and onto the tray 119 (if present). Pulling the cartridge 102 from the slot 110 may permit the hook 112 to disengage the pincher arm 116 and flex laterally (as at arrow 249) back in toward the space previously occupied by the notch 114 of the cartridge 102. For example, the hook 112 may press against the cartridge 102 until the cartridge 102 is fully removed, at which point the hook 112 may be positioned across an opening of the slot 110, e.g., so that the hook 112 is in a position ready to engage a cartridge 102 subsequently inserted into the slot 110.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
a tape cartridge comprising a rectangular body defined by a first lateral side wall and a second lateral side wall, the tape cartridge further comprising a first notch in the first lateral side wall and a second notch in the second lateral side wall;
a tape library rack comprising a plurality of partitions including a first lateral partition and a second lateral partition spaced apart from one another to define there between a slot sized for receiving the tape cartridge;
a first hook coupled with the first lateral partition and comprising a first sloped extension releasably engaged in the first notch of the tape cartridge;
a second hook coupled with the second lateral partition and comprising a second sloped extension releasably engaged in the second notch of the tape cartridge;
a gripper comprising a first arm, a second arm, a driver, and a pincher, wherein the first arm and the second arm are spaced to engage the first notch and the second notch of the tape cartridge and the first hook and the second hook of the tape library rack, the first arm comprising a first ramped surface and the second arm comprising a second ramped surface, the gripper selectively movable by the driver toward the slot to cause the first ramped surface of the first arm to engage and travel along the first sloped extension of the first hook so as to displace the first hook out of engagement from the first notch of the tape cartridge and to cause the second ramped surface of the second arm to engage and travel along the second sloped extension of the second hook so as to displace the second hook out of engagement from the second notch of the tape cartridge, wherein the first arm and the second arm are selectively engageable respectively in the first notch and the second notch of the tape cartridge by the pincher for gripping the tape cartridge for moving the tape cartridge relative to the slot by movement of the gripper.

2. The system of claim 1, wherein the slot comprises a front edge defined by forward edges of the first lateral partition and the second lateral partition, wherein the front edge defines a boundary of the slot at which the tape cartridge transitions between being partially or fully received within the slot and fully removed from the slot when moved relative to the slot, and wherein the first hook and the second hook each extend respectively from the first lateral partition and the second lateral partition past the front edge of the slot.

3. The system of claim 1, wherein the first hook comprises a first elongate member extending along the first lateral partition and terminating in the first sloped extension, wherein the first sloped extension of the first hook is angled toward an interior and toward a rear of the slot; and
wherein the second hook comprises a second elongate member extending along the second lateral partition and terminating in the second sloped extension, wherein the second sloped extension of the second hook is angled toward the interior and toward the rear of the slot;
whereby the first hook and the second hook are each shaped such that an increase in a force urging the cartridge from the slot causes an increase in a resisting force provided by the hooks that opposes removal of the cartridge from the slot.

4. The system of claim 1, wherein the gripper comprises a base to which the first arm and the second arm are coupled, wherein the first ramped surface of the first arm extends away from the base and toward the second arm, wherein the second ramped surface of the second arm extends away from the base and toward the first arm.

5. A system, comprising:
a tape library rack comprising:
a plurality of partitions comprising:
a first lateral partition;
a second lateral partition; a first slot between the first and second partitions and sized for receiving a tape cartridge, the first slot comprising:
a width defined in a lateral direction between the first lateral partition and the second lateral partition; and
a depth defined in an axial direction along a forward direction and rearward direction of the slot; and
a front edge defined by forward edges of the first lateral partition and the second lateral partition;
a second slot laterally adjacent the first slot such that the first partition is positioned laterally between the first slot and the second slot, wherein the second slot is sized for receiving a tape cartridge;
a first hook coupled with the first lateral partition and comprising a first sloped extension biased into a first position extending into a space for receiving the cartridge, the first hook being aligned and comprising a resiliently flexible material such that the resilience of the material biases the hook into the space; and
a second hook coupled with the first lateral partition and extending into a space of the second slot, the second hook offset in a height direction from the first hook so that each of the first hook and the second hook do not interfere with an ability of the other to displace out of the respective space associated therewith.

6. The system of claim 5, further comprising a gripper comprising a first arm with a first ramped surface contactable with the first or second hook to cause the first or second hook to flex laterally out of space when the arm is inserted into the first or second slot by movement of the gripper.

7. The system of claim 5, wherein the first or second hook flexes laterally out of space in response to contact with a first ramped surface of a first arm of a gripper, the contact resulting from a tape cartridge being inserted into the first or second slot by movement of the gripper while the gripper grips the tape cartridge.

8. The system of claim 5, wherein the first or second hook extends from the first lateral partition past the front edge of the slot.

9. The system of claim 5, further comprising a third hook coupled with the second lateral partition and comprising a second sloped extension biased into a second position extending into the space for receiving the cartridge.

10. The system of claim 9, further comprising a gripper comprising a first arm with a first ramped surface and a second arm with a second ramped surface, the first and second ramped surfaces contactable with the first and third hooks to cause the first and third hooks to flex laterally out of space in response to movement of the gripper.

11. The system of claim 9, wherein the first and third hooks flex laterally out of space in response to contact with a first ramped surface of a first arm of a gripper and a second ramped surface of a second arm of the gripper, the contact resulting from a tape cartridge being inserted into the first slot by movement of the gripper while the gripper grips the tape cartridge.

12. The system of claim 5, wherein the first partition further comprises:
a first side;
a second side;
a first depression formed in the first side;
a second depression formed in the second side and axially offset from the first depression; and
a passage formed in the axial direction by an overlap between the first depression and the second depression;
wherein the first and second hooks are received in the first partition.

13. The system of claim 5, wherein the tape cartridge is a first tape cartridge inserted into the first slot and the second hook flexes laterally out of space in response to contact with a first ramped surface of a first arm of a gripper, the contact resulting from a second tape cartridge being inserted into the second slot by movement of the gripper while the gripper grips the second tape cartridge.

14. The system of claim 5, wherein the tape cartridge is a first tape cartridge inserted into the first slot and the system further comprises a gripper comprising a first arm with a first ramped surface contactable with the second hook to cause the second hook to flex laterally out of space when the arm is inserted into the second slot by movement of the gripper.

15. The system of claim 14, further comprising a second tape cartridge inserted into the second slot, wherein the gripper grips the second tape cartridge when the gripper is inserted into the second slot.

* * * * *